(12) United States Patent
Wells et al.

(10) Patent No.: US 9,545,095 B2
(45) Date of Patent: *Jan. 17, 2017

(54) APPARATUS, METHOD AND KIT FOR EXTERMINATION OF PESTS

(76) Inventors: David Wells, Rotorua (NZ); Luc Desbonnets, Aukland (NZ)

(*) Notice: Subject to any disclaimer, the term of this patent is extended or adjusted under 35 U.S.C. 154(b) by 680 days.

This patent is subject to a terminal disclaimer.

(21) Appl. No.: 13/585,787

(22) Filed: Aug. 14, 2012

(65) Prior Publication Data

US 2012/0304527 A1 Dec. 6, 2012

Related U.S. Application Data

(63) Continuation-in-part of application No. 13/065,998, filed on Apr. 4, 2011, now abandoned, which is a continuation of application No. 10/581,533, filed as application No. PCT/NZ2004/000316 on Dec. 6, 2004, now Pat. No. 7,918,050.

(30) Foreign Application Priority Data

Dec. 4, 2003 (NZ) .......................... 529970

(51) Int. Cl.
A01M 23/34 (2006.01)
A01M 23/00 (2006.01)

(52) U.S. Cl.
CPC .................... *A01M 23/34* (2013.01)

(58) Field of Classification Search
CPC .................................................. A01M 23/34
USPC ..... 43/85-87; 100/9; 53/399, 582-585, 589, 53/592
See application file for complete search history.

(56) References Cited

U.S. PATENT DOCUMENTS

| 21,302 | A | * | 8/1858 | Reuthe | 43/85 |
|---|---|---|---|---|---|
| 823,877 | A | * | 6/1906 | Kellogg | 606/140 |
| 901,851 | A | * | 10/1908 | Thompson | 43/85 |
| 1,091,923 | A | * | 3/1914 | Frenier | 43/87 |
| 1,107,218 | A | * | 8/1914 | Kirk | 43/85 |
| 1,301,708 | A | * | 4/1919 | Knutson | 604/346 |
| 1,899,641 | A | * | 2/1933 | Schwartz et al. | 43/86 |
| 2,068,107 | A | * | 1/1937 | Nygard | 100/9 |
| 2,236,936 | A | * | 4/1941 | Camp | 100/9 |
| 2,247,066 | A | * | 6/1941 | Popp | 43/87 |
| 2,514,038 | A | * | 7/1950 | Doolittle | 100/9 |
| 2,619,964 | A | * | 12/1952 | Thaete | 606/140 |
| 2,764,160 | A | * | 9/1956 | Alexander et al. | 100/9 |
| 2,856,676 | A | * | 10/1958 | Furst | 29/765 |
| 3,078,631 | A | * | 2/1963 | Seserman | 53/582 |
| 3,271,890 | A | * | 9/1966 | Davis | 43/4 |
| 3,386,371 | A | * | 6/1968 | Farmer et al. | 100/9 |
| 3,726,278 | A | * | 4/1973 | Scott | 606/163 |
| 3,915,150 | A | * | 10/1975 | Ray | 128/842 |
| 3,965,607 | A | * | 6/1976 | Lee | 43/87 |

(Continued)

FOREIGN PATENT DOCUMENTS

| FR | 2583617 A1 | * | 12/1986 | ............ A01M 23/30 |
|---|---|---|---|---|
| GB | 2095526 A | * | 10/1982 | ............ A01M 23/00 |

(Continued)

*Primary Examiner* — Darren W Ark
(74) *Attorney, Agent, or Firm* — Van Dyke Law; Raymond Van Dyke (57) ABSTRACT

An apparatus, method and kit for the extermination of pests, including animal pests such as vermin. The invention relates generally to a spring-less extermination apparatus which kills pests with stretchable rings.

28 Claims, 8 Drawing Sheets

(56) References Cited

U.S. PATENT DOCUMENTS

| | | | | |
|---|---|---|---|---|
| 3,974,762 A * | 8/1976 | Kita et al. | ........................ | 100/9 |
| 4,432,124 A * | 2/1984 | Breuers | ........................... | 29/235 |
| 4,442,765 A * | 4/1984 | Limehouse et al. | ............... | 100/9 |
| 4,470,241 A * | 9/1984 | Parry et al. | ........................ | 100/9 |
| 4,480,536 A * | 11/1984 | Burns | ............................... | 100/9 |
| 4,519,178 A * | 5/1985 | Crabb, Jr. | ......................... | 100/9 |
| 4,628,915 A * | 12/1986 | Chaney | ........................... | 600/41 |
| 4,662,102 A * | 5/1987 | Marcolina | ........................ | 43/85 |
| 4,691,467 A * | 9/1987 | Brimmer | ........................ | 43/44.4 |
| 4,735,011 A * | 4/1988 | Spillett | ............................ | 43/86 |
| 4,791,707 A * | 12/1988 | Tucker | ............................ | 227/19 |
| 5,083,556 A * | 1/1992 | Osbon et al. | ................... | 600/39 |
| 5,177,896 A * | 1/1993 | Miyasaki | ........................... | 43/87 |
| 5,561,940 A * | 10/1996 | Miyasaki | ........................... | 43/87 |
| 5,588,278 A * | 12/1996 | Wynn et al. | ..................... | 53/399 |
| 5,643,290 A * | 7/1997 | Clark et al. | ..................... | 606/141 |
| 5,692,336 A * | 12/1997 | Fiore et al. | ....................... | 43/85 |
| 5,746,020 A * | 5/1998 | Fiore et al. | ....................... | 43/85 |
| 5,956,891 A * | 9/1999 | Lee | ................................... | 43/87 |
| 6,125,569 A * | 10/2000 | Link | ................................... | 43/4 |
| 7,257,934 B2 * | 8/2007 | Swift et al. | ..................... | 53/399 |
| 7,565,789 B2 * | 7/2009 | Lucas et al. | ..................... | 53/582 |
| 7,918,050 B2 * | 4/2011 | Sturgeon et al. | ................. | 43/87 |
| 2008/0244955 A1 * | 10/2008 | Wilson | ................................ | 43/4 |
| 2009/0090042 A1 * | 4/2009 | Lasseur et al. | ................... | 43/85 |
| 2011/0271583 A1 * | 11/2011 | Sturgeon et al. | ................. | 43/85 |

FOREIGN PATENT DOCUMENTS

| | | | | |
|---|---|---|---|---|
| JP | 2001333683 A * | 12/2001 | ............ | A01M 23/30 |
| JP | 2003070408 A * | 3/2003 | ............ | A01M 23/24 |
| JP | 2009273423 A * | 11/2009 | ............ | A01M 23/24 |
| WO | WO 9310661 A1 * | 6/1993 | ............ | A01M 23/00 |

* cited by examiner

APPARATUS, METHOD AND KIT FOR EXTERMINATION OF PESTS

CROSS REFERENCE TO RELATED APPLICATIONS

The present invention is a continuation-in-part application claiming priority from U.S. patent application Ser. No. 13/065,998, entitled "METHOD AND APPARATUS FOR EXTERMINATION OF PESTS," filed Apr. 4, 2011, which is a continuation of U.S. patent application Ser. No. 10/581, 533, entitled "METHOD AND APPARATUS FOR EXTERMINATION OF PESTS," filed Apr. 9, 2007, now U.S. Pat. No. 7,918,050, issued Apr. 5, 2011, which is a National Stage Entry of PCT Patent Application Serial No. PCT/NZ04/000316, filed Dec. 6, 2004, and New Zealand Patent Application Serial No. 529970, filed Dec. 4, 2003, and the subject matters of all of these earlier disclosures are incorporated by reference herein.

FIELD OF THE INVENTION

The invention relates to a method and apparatus for the extermination of pests, including mice, rats, stoats and other vermin.

BACKGROUND OF THE INVENTION

In a number of countries such as New Zealand, introduced species of animal have had a detrimental effect on the indigenous or native plant, bird, insect, and other life.

In an attempt to control and exterminate pests, whether introduced species or not, a large number of different traps and similar mechanisms have been designed to capture and/or kill pests. A difficulty with many such traps is that the trapped pest does not die humanely and this can be a particular concern. A typical trap which is inhumane is the type of trap generally known as a gin trap which has a set of jaws to clamp a part of the pest. Normally in gin traps a pest is held until it either dies naturally or alternatively is killed by a person attending the trap.

In known traps, including household mouse traps, the pest's body is attached to the trap. This leads to waste, since some squeamish owners would rather throw the entire trap away than empty and reset the trap. This also sometime leads to the trap becoming dirty, especially if the trap is not emptied promptly and the pest's body decays. This may affect the functioning of the trap.

U.S. Pat. No. 2,247,066 and U.S. Pat. No. 5,177,896 both disclose a snare in which a noose is released onto a pest. A spring or elastic band is arranged so as to hold the noose around the pest, without tightening the noose. Nor does the spring or elastic band itself tighten sufficiently to kill the pest. The noose is tightened when the animal tries to escape, as with any conventional snare, restraining the animal in an inhumane manner. Both snares are intended to catch an animal alive. For example, in U.S. Pat. No. 2,247,066 the spring is arranged to limit the minimum size of the noose so as to hold the animal without harming it (see page 2, right hand column, lines 38 to 70). These snares are therefore both restraining devices rather than extermination devices.

Furthermore, in U.S. Pat. No. 2,247,066 and U.S. Pat. No. 5,177,896 the animal, once snared, remains attached to the snare by the noose. This is necessary where animals are to be captured alive and the snares must therefore be checked regularly. However, it is undesirable in devices for extermination of pests, where traps may not be checked regularly and the pest remains decay, which results in a dirty trap, and the function of the trap may be affected. Also, if an animal is still attached to the snare another pest is unlikely to approach the snare to activate the trigger mechanism.

JP 2003070408 and JP 2001333683 both set forth a device for attaching a bell to a rat. The bell is held in place by an elastic band. However, the elastic band does not kill the rat.

An object of the invention is to provide an extermination device allowing extermination of a pest in a quick, efficient and humane manner, or at least to provide the public with a useful choice.

A further object of the present invention is to provide a lightweight versatile user friendly relatively inexpensive means for exterminating pests which at least offers a useful alternative choice.

A further object of the invention is to provide a means for exterminating a pest which substantially eliminates the risk of killing wildlife which is intended to be saved or preserved by use of the means for extermination, or to at least provide the public with a useful choice.

SUMMARY OF THE INVENTION

In one particular aspect, the instant invention encompasses an extermination device for a pest including a loading frame, a firing arm, and a release arm.

For example, the loading frame includes a front end and a back end, wherein the front end of the loading frame includes an opening and has a greater diameter than the back end of the loading frame, and wherein the loading frame is configured such that a stretchable ring can be expanded over the back end and rolled towards the front end until positioned over the opening.

Further, the loading frame includes a top and a bottom, wherein the top of the loading frame is configured to hold the firing arm over the release arm and the bottom of the loading frame is configured to allow a pest to put its head into the opening of the loading frame.

Additionally, the firing arm includes a front end and a back end, wherein the front end of the firing arm is configured to pivot such that the front end of the firing end can move downwards towards the opening of the loading frame while the back end of the firing arm can move upwards away from the loading frame.

Furthermore, the front end of the firing arm is preferably configured to hold the stretchable ring over the opening of the loading frame and the back end of the firing arm is configured to engage with a back end of the release arm.

Also, the release arm includes a front end and a back end, wherein the back end of the release arm is configured to pivot such that the back end of the release arm can move backwards towards the back end of the loading frame and the front end of the release arm can move upwards towards the firing arm.

In addition, the front end of the release arm includes a terminus that is angled downwards into the opening of the loading frame and the back end of the release arm comprises a sear that engages with the back end of the firing arm.

Further, the extermination device is preferably configured such that, when the terminus of the release arm is pushed upwards by the head of the pest, this causes the sear of the release arm to disengage from the back end of the firing arm, and thereby causes the front end of the firing arm to pivot downwards towards the opening and release the stretchable ring such that it contracts around the pest.

Also, the loading frame may be tubular and may be closed at the back end. The loading frame may include protrusions which assist in rolling the stretchable ring towards the opening of the loading frame. The loading frame may include an expanded tip at the back end to prevent the stretchable ring from being released from the back end.

The device may include an area to place bait, food, or an attractant. The stretchable ring may be made from natural or synthetic rubber. The stretchable ring may be made from a composite material. The opening of the loading frame may be in the range of about 20 to about 40 mm. Also, the opening of the loading frame may be in the range of about 40 mm to about 120 mm.

The loading frame may be connected to a tunnel frame, wherein the tunnel frame is configured to allow a pest to enter through an opening of the tunnel frame and approach the opening of the loading frame. The opening of the tunnel frame may be in the range of about 40 to about 100 mm. Alternatively, the opening of the tunnel frame may be in the range of about 100 mm to about 250 mm. The loading frame may be secured to the tunnel frame by lugs and/or clips.

In another aspect, the invention encompasses a method of exterminating a pest using the extermination device according to any one of the previous aspects, including: arming the loading frame with a stretchable ring expanded over the opening of the loading frame, allowing the pest to put its head into the opening of the loading frame and thereby push up the terminus of the release arm, thereby causing the sear of the release arm to disengage from the back end of the firing arm, thereby causing the front end of the firing arm to pivot downwards towards the opening of the loading frame and release the stretchable ring such that it contracts around the pest, and thereby terminating the pest.

In contrast to prior apparatuses, the invention provides a device for exterminating pests where a rubber ring is released onto a pest to exterminate the pest. In particular, the invention relates to an extermination device, not to a restraining or holding device. The mechanisms reported previously are not suitable for use in such a device.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying DRAWINGS, where like reference numerals designate like structural and other elements, in which:

DESCRIPTION OF THE INVENTION

The following detailed description is presented to enable any person skilled in the art to make and use the invention. For purposes of explanation, specific nomenclature is set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

Examples of an earlier aspect of the present invention, such as set forth in Applicants' aforementioned U.S. Pat. No. 7,918,050, will now be described with reference to the accompanying drawings. The first example in FIGS. 1 to 5 of the drawings show the actual size of an extermination device designed for rats or stoats. It is to be appreciated that for other animals the overall size and dimensions of the extermination device may be larger or smaller as needed to suit the size of the target pests.

Figures 1, 2, 3, 4:
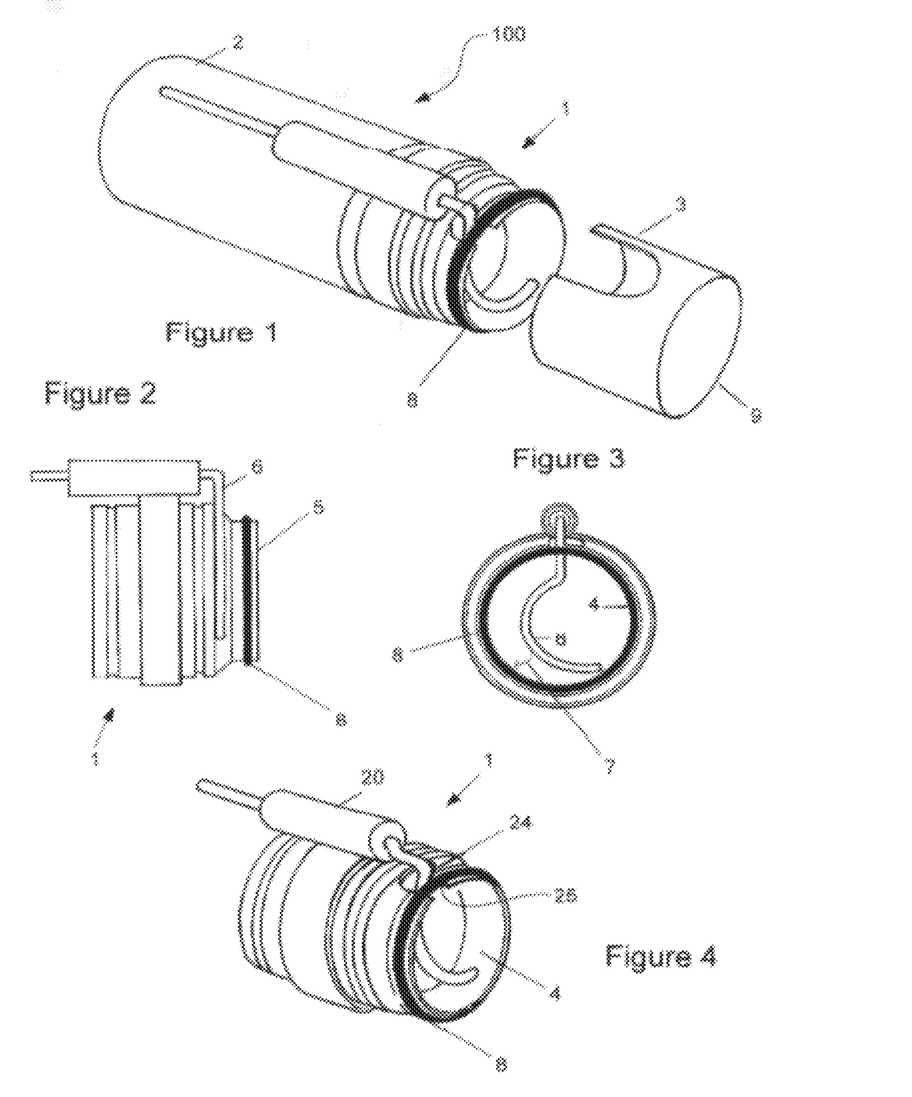
FIG. 1 is a perspective view from the side of an extermination device according to a first embodiment of the invention.
FIG. 2 is a side view of the extermination device shown in FIG. 1.
FIG. 3 is an end view of the extermination device as shown in FIG. 1.
FIG. 4 is a perspective view from the side of the extermination device shown in FIG. 1.
Figure 5:
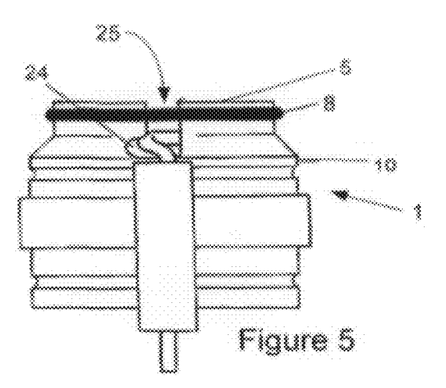
FIG. 5 is a plan view of the exterminator device of FIG. 1.

In FIG. 1 is shown an extermination device including a holder 100 and a front cover 3. The holder 100 is shown in more detail in FIGS. 2 to 4. The holder 100 comprises a central section 1 and a cover 2, and is tubular, with an internal bore 4. The holder may be circular in cross-section as shown in the drawings, or may have another suitable cross-section. The diameter of the bore 4 is chosen to suit the target pest and the tube has an entrance or open mouth 5 at a first end where the pest enters. For small pests such as mice, rats and stoats the diameter is preferably in the range 25 to 40 mm. For larger pests such as polecats, possums and cats, the diameter is preferably in the range 60 to 100 mm.

The second end of the holder 100 is formed by the cover 2, creating a closed region in which food or an attractant is placed. The extermination device has a trigger operated by a trigger mechanism 6 shown in FIG. 3. To set the trigger mechanism, it is pushed backwards in a slot 25 and to the right (as shown in FIG. 4), such that it sits in a notch 24 in the holder. When a pest enters the trap, the trigger mechanism 6 moves arcuately (as shown by arrow 7 in FIG. 3), so that it is released from the notch and is forced forwards by a spring 20 to release the resilient ring 8. The resilient ring 8 is mounted relative to the mouth 5 of the extermination device in a release position, adjacent to the open mouth 5, such that after it slides off the open mouth 5 it contracts around whatever is within the open mouth 5 of the holder 100. Other trigger mechanisms may also be suitable.

The resilient ring 8 may be formed of natural or synthetic rubber or a composite material. It could also be formed from metal in the form of a spring, or at least partly of rigid material with a biasing means tending to force sides of the ring together. While the resilient ring is preferably circular in shape, it could, for example, be formed from a rectangle of resilient material with a hole cut through it. Other configurations may also be suitable. The resilient ring 8 has a normal diameter that is significantly less than the diameter of the holder at the release position so that on release from the open mouth 5 it contracts to its normal size which is less than the size of the neck of the target pest.

On activation of the trigger mechanism 6 by a pest whose head is within the mouth 5 the rubber or composite ring 8 traps whatever is in the mouth of the extermination device. Any animal or pest that activates the trip arm 6 therefore has immediately placed around its neck a resilient ring which will cut off the blood and air supply to the animal thereby killing it humanely. The ring is dimensioned and the material used for the ring is chosen to create a sufficient inwards force to achieve this purpose.

A suitable ring for extermination of mice, rats, stoats and squirrels may have an outside diameter of about 14 mm and an inside diameter of about 6 mm. The ring may then be stretched onto a holder, such that its inside diameter is about 40 mm. Rings used in New Zealand for docking sheep's tails have been found suitable. Rings of different sizes are of course suitable for pests of different sizes.

After release of the ring, the pest and the ring free of the device. Since the ring 8 is not retained by the extermination device, the animal may still move away from the site of the extermination means, so that other pests will be able to actuate the trigger mechanism. This also means that the body of the pest is not attached to the device, allowing a person to reset the device with a new ring without touching the pest's body. Also, if the pest moves away from the device, the device will not be affected by the decaying remains of the pest. This also allows an automatic reloading mechanism to be used, as described below.

As shown in FIG. 1, a front cover 3 can be provided and is designed to protect against accidental tripping of the trip arm. The front cover 3 has an opening 9 to allow a pest to access the opening 5. The front cover 3 connects with the holder at surface 10 and is positioned so that the target animal can still reach and actuate the trigger mechanism.

Figure 6:
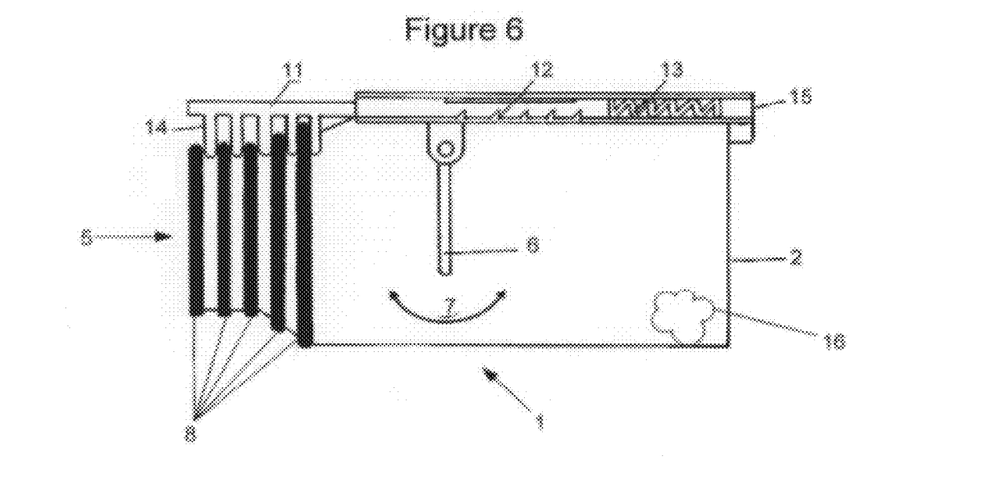
FIG. 6 is a vertical section through an example of an alternative extermination device, incorporating a reloading and/or resetting mechanism with a plurality of resilient rings.

In a second example of the earlier aspect of the present invention, as shown in FIG. 6, the extermination device has similar parts to those incorporated in the first example referenced by the same numerals. In this case, the exterminator device has an automatic loading mechanism. The loading mechanism includes a moveable shaft 11 with a ratchet mechanism 12 operated by the trigger mechanism 6. Movement of the shaft 11 is under the bias of a spring 13. The shaft 11 includes stops 14. A hinged cover 15 is provided to enable access to the mechanism when it is being reloaded with more or additional rings 8.

In use when an animal pest tries to eat bait or attractant 16 it knocks the trigger mechanism 6. A first ring is released from the release position, contracting around the pest's neck. The spring 13 will then push forward and the trigger mechanism will be reset on its next notch ready to be tripped again. The forward movement of the shaft 11 presents the next in the succession of rings 8 to the release position adjacent to the mouth 5 of the holder 100.

Figure 7:
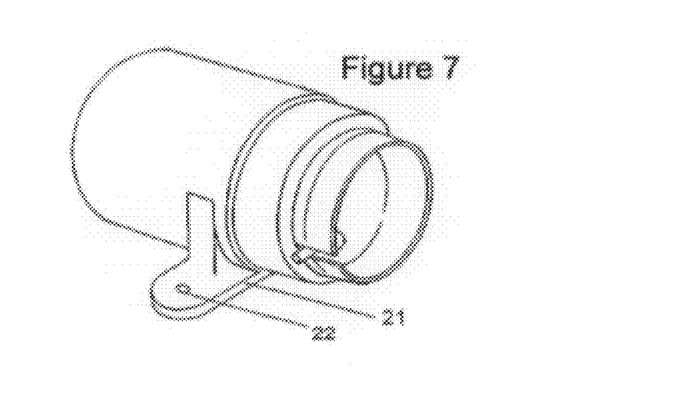
FIG. 7 is a perspective view of an example of another embodiment of the extermination device of the present invention having an internal trigger mechanism.
Figure 8:
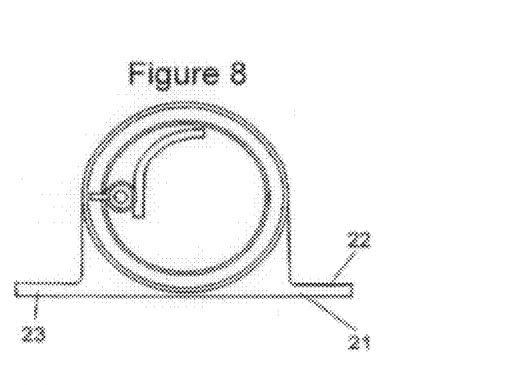
FIG. 8 is a plan view of the device of FIG. 7.

With reference now to FIGS. 7 and 8 of the DRAWINGS, there is shown a third example of an extermination device according to said earlier aspect of the present invention the invention. This example differs from the device described above in that the trigger mechanism is located within the holder. This protects the trigger mechanism from dirt, twigs and the like, which may prevent it from functioning correctly. The trigger functions in a manner similar to that described above. These figures also show the device with a base plate 21 for mounting the extermination device in a suitable position. The base plate 21 preferably includes holes 22, 23 to facilitate such mounting.

Figure 9:
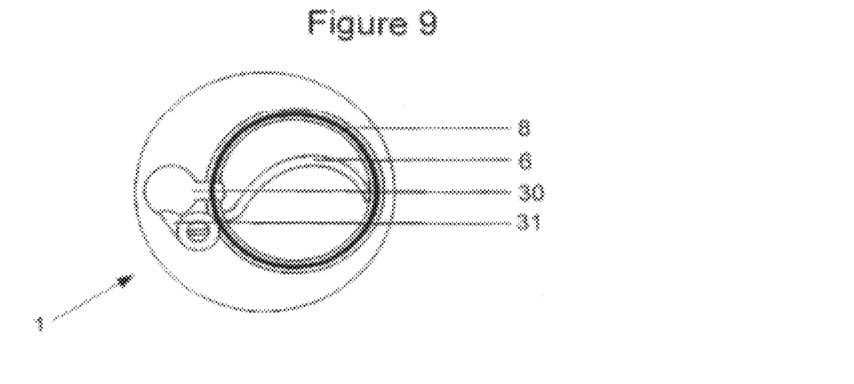
FIG. 9 is a front plan view of a further embodiment of an extermination device.
Figure 10:
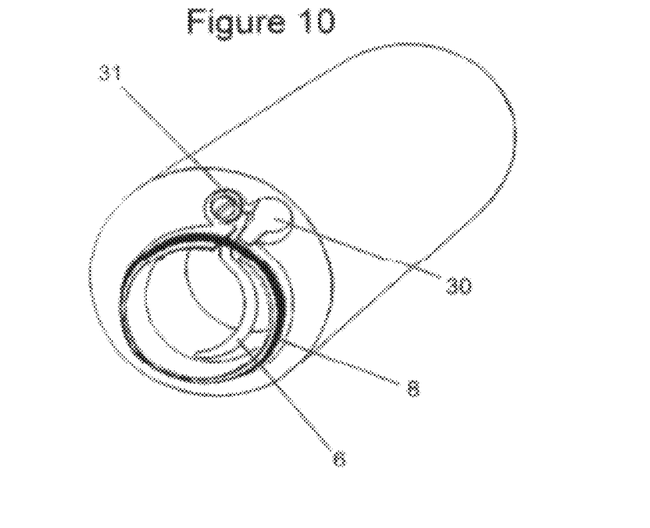
FIG. 10 is a perspective view of the device of FIG. 9.
Figure 11:
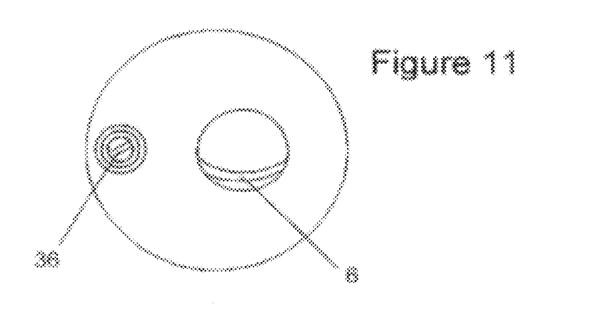
FIG. 11 is a rear plan view of the device of FIG. 9.
Figure 13:
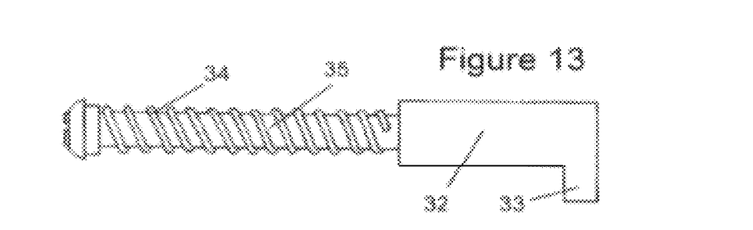
FIG. 13 shows the firing mechanism of the device of FIG. 9.

A preferred embodiment of the invention is shown in FIGS. 9 to 19. FIG. 9 is a front plan view, and FIG. 10 is a perspective view, of the extermination device 1, showing the trigger mechanism 6, firing hammer 30 and resilient ring 8. With reference to FIG. 13, the firing hammer 30 includes a generally cylindrical section 32 and a protrusion 33. The cylindrical section 32 slides on rod 35, which is joined to the rear face of the device housing by a screw 36, as shown in FIG. 11. A spring 34 is mounted on the rod 35, to urge the firing hammer 30 along the rod 35 towards the resilient ring 8.

Figure 14:
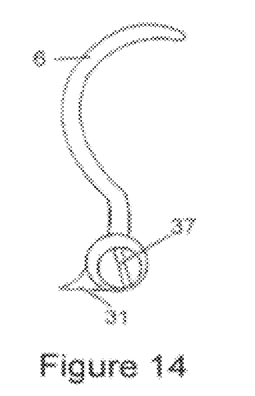
FIG. 14 shows the trigger mechanism of the device of FIG. 9.

With reference to FIG. 14, the trigger mechanism 6 is formed integrally with a lug 31 and is attached to the device housing by a screw 37.

Figure 12:
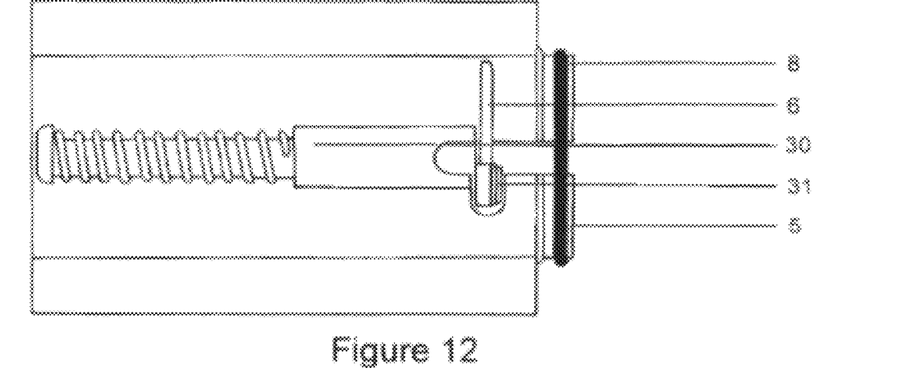
FIG. 12 is a side plan view of the device of FIG. 9, showing internal features.
Figure 15:
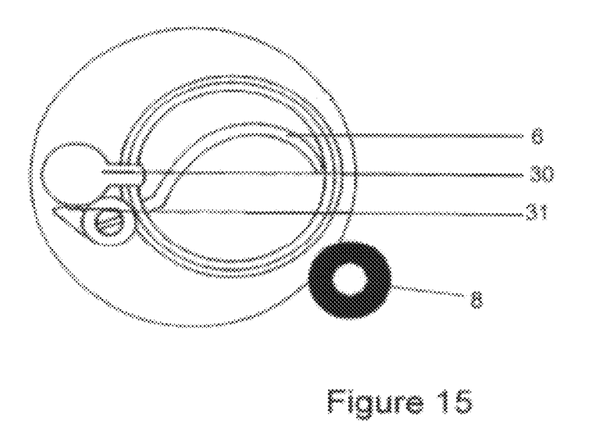
FIG. 15 is a view similar to FIG. 9, showing the device after it has been triggered and has released the resilient ring.
Figure 16:
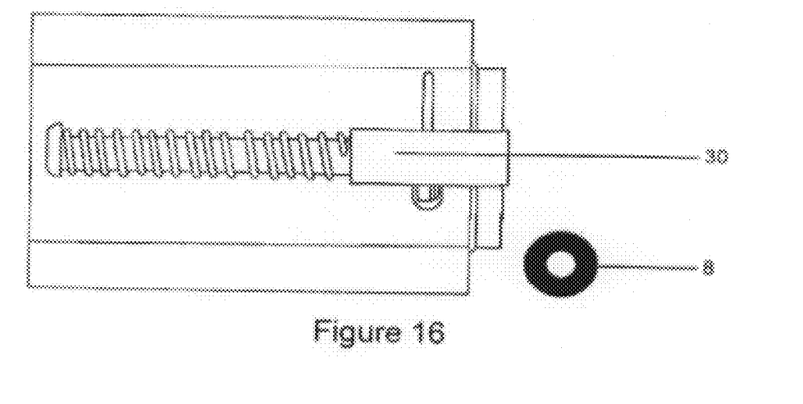
FIG. 16 is a view similar to FIG. 12, showing the device after it has been triggered and has released the resilient ring.

In the cocked position shown in FIG. 12, the firing hammer compresses the spring 34 and is held in position by the lug 31, as best shown in FIG. 9. When a pest enters the trap, forcing the trigger mechanism 6 upwards, the trigger mechanism pivots around the screw 37, such that the lug 31 no longer restricts movement of the firing hammer 30. The firing hammer slides along the rod 35 towards the resilient ring 8. The protrusion 33 forces the resilient ring 8 off the holder, onto the pest. The position of the extermination device in the fired position is shown in FIGS. 15 and 16.

In practice, a robust firing mechanism such as that described above is required. This is because the resilient ring must be stretched over the holder. As the ring is dimensioned and of sufficient resilience to block the pest's blood and air supplies, the inward force created by this stretching is large, so that forcing the ring off the holder also requires a large force.

Figure 17:
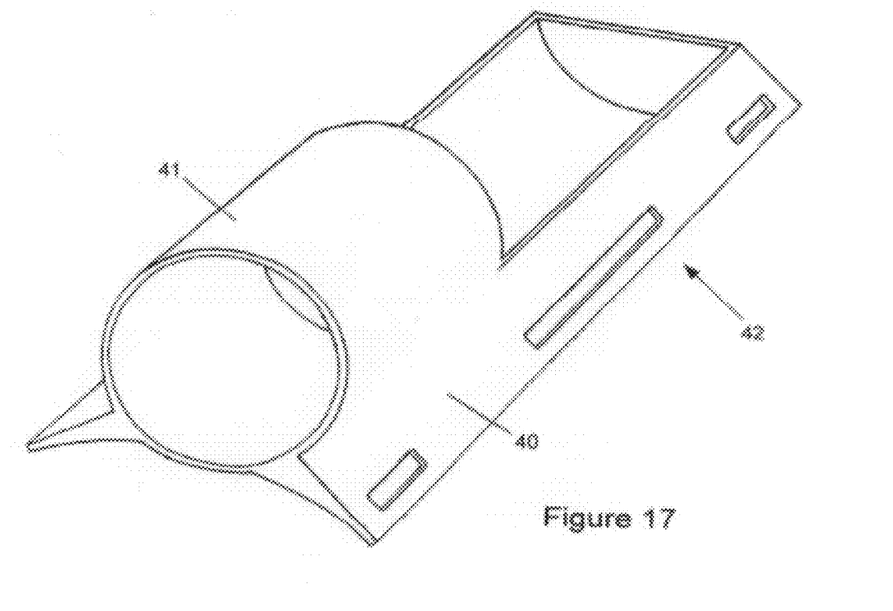
FIG. 17 is a perspective view of a cover for use with the extermination device of FIG. 9.
Figure 18:
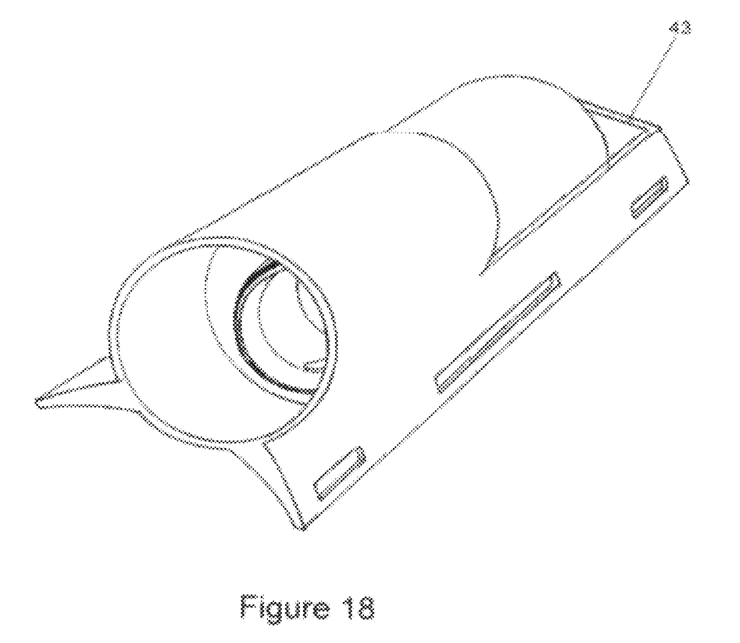
FIG. 18 is a perspective view of the device of FIG. 9 and the cover of FIG. 17 in an assembled state.

FIG. 17 shows a cover 42 for use with the extermination device of this embodiment. The cover 42 includes a base section 40 and a cylindrical section 41. The base section 40 may include holes and/or slots for securing the extermination device to the ground, a tree etc. The device shown in FIGS. 9 to 16 is assembled with the cover 42, as shown in FIG. 18. FIG. 18 shows the device and cover in a partially assembled state. The device is pushed into the cover through the cylindrical section 41. In a fully assembled state the device would rest against the end 43 of the cover. This arrangement protects the mechanism of the device from contamination by dirt etc and prevents animals of a size greater than the diameter of the cylindrical section 41 from activating the trap.

Figure 19:
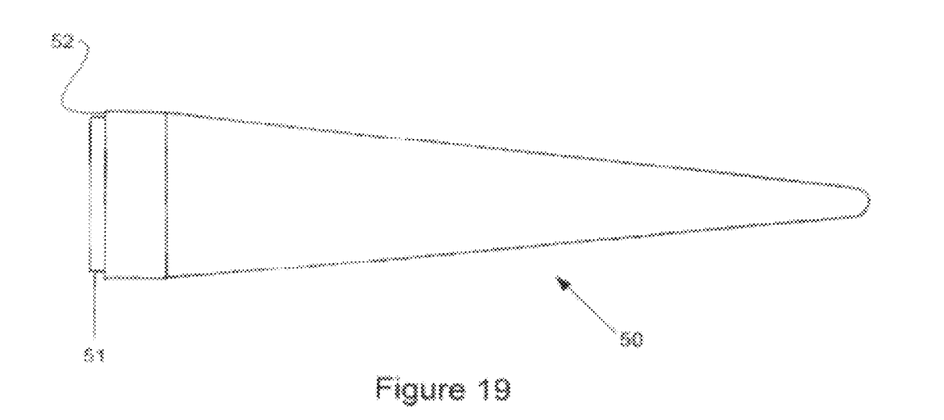
FIG. 19 is a plan view of a loading device which may be used with the extermination device of FIG. 9.

FIG. 19 shows a loading device for use with the extermination device of FIGS. 9 to 16. The loading device includes a generally conical section 50 and a coupling section 51. In use, the device is set in the cocked position and the coupling section 51 is inserted into the device, such that the shoulder 52 sits flush with the open mouth 5 of the device. A resilient ring 8 can then be forced along the generally conical section 50 and into the release position on the extermination device. The loading device is then removed.

The device may be placed in any position that a targeted pest can access. The device may be placed on the ground, in a tree or attached to a board or post, for example.

The aforementioned earlier innovations, set forth in the hereinabove description, are intended as supportive to the further inventive description set forth hereinbelow, particularly to the specification and claims. As noted, the specifications and claims of these earlier disclosures are incorporated herein by reference.

Turning now to particular aspects of the present invention, the instant invention also generally encompasses a springless pest extermination device, which kills pests with stretchable or collapsible rings. Examples of the instant invention will now be described with reference to the accompanying drawings, particularly FIGS. 20-28 of the DRAWINGS, and the disclosure set forth hereinbelow, taken in conjunction with the principles and disclosure set forth hereinabove.

Figure 20:
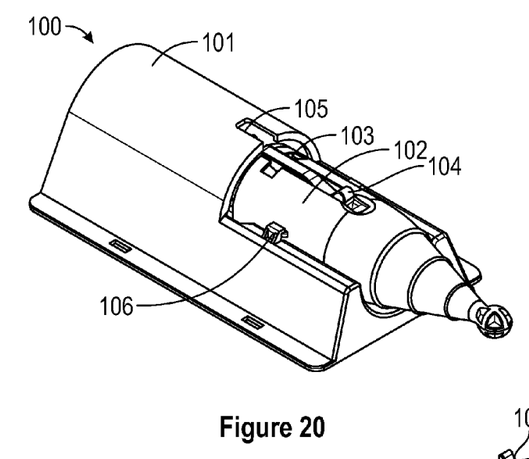
FIG. 20: illustrates another embodiment of a spring-less pest extermination device pursuant to the teachings of the present invention.

With reference now to FIG. 20 of the DRAWINGS, there is shown an improved extermination device, generally designated by the reference numeral 100, which is particularly suited for smaller vermin, such as mice. A safety tunnel 101 is illustrated, which includes a docking site for a loading frame, generally designated by the reference numeral 102, as well as a security lug 106 to hold the loading frame 102 and a slot 105 for the firing arm 103 of the loading frame 102, each of said components being described in more detail hereinbelow.

Figure 21:
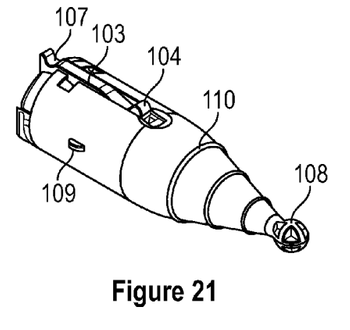
FIG. 21: illustrates a component of the pest extermination device of FIG. 20, particularly a loading frame.
Figures 24, 25, 26, 27, 28:
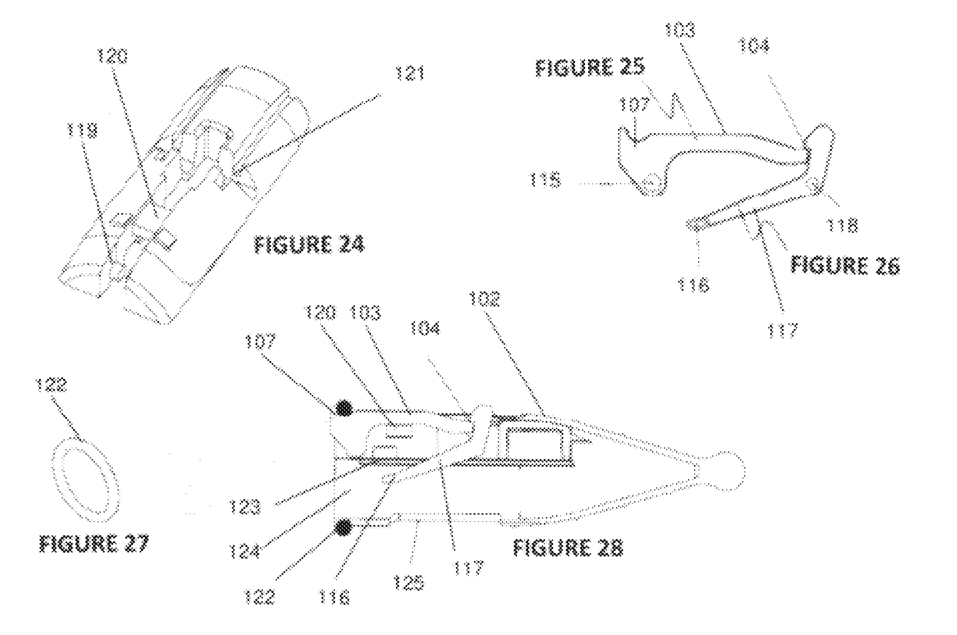
FIG. 24: illustrates another component of the pest extermination device of FIG. 20, which receives the firing mechanism of FIG. 23, forming an assembly.
FIG. 25: illustrates a component of the firing mechanism of FIG. 23, particularly a firing arm therein.
FIG. 26: illustrates another component of the firing mechanism of FIG. 23, particularly, a release arm.
FIG. 27: illustrates a stretchable ring for disengageable employment around the loading frame of FIG. 21 and adjacent the firing mechanism of FIG. 23.
FIG. 28: illustrates in cross section the extermination device of FIG. 20, with the firing arm assembly engaged and the loading frame armed.

With reference now to FIG. 21 of the DRAWINGS, there is shown the loading frame 102 of the instant invention in more detail, including the firing arm 103, which includes a lip 107 for holding a stretchable ring 122 (as shown in FIG. 27), a sear 104, which holds the firing arm 103 in a locked and armed position, and a security slat or member 109, which fits into the aforementioned security lug 106 on the safety tunnel 101 (see also FIG. 28). Also shown are a non-return ridge 110, which assists in loading the stretchable ring 122, and a non-return knob 108, which prevents the stretchable ring 122 from exiting the tip of the loading frame 102.

Figure 22:
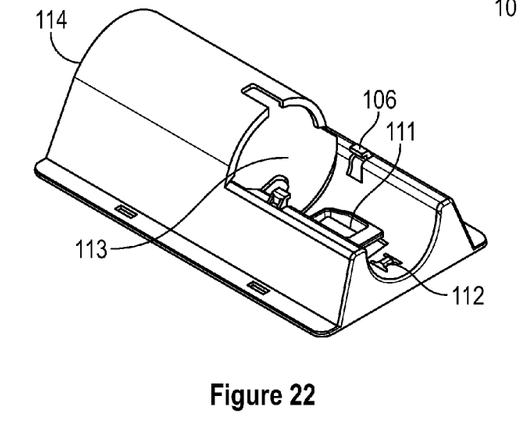
FIG. 22: illustrates another component of the pest extermination device of FIG. 20, particularly a safety tunnel therein, including bait vestibule.

As illustrated in FIG. 22, showing the safety tunnel 101 in more detail, the safety tunnel includes an opening generally designated by the reference numeral 114 at one end for the pest to enter, and a channel generally designated by the reference numeral 113 through which the pest crawls and approaches the loading frame 102, when docked. Also shown are a security lug 106, shown from the inside of the safety tunnel 101, as well as a safety clip 112, which slots into the loading frame 102, and a bait vestibule 111, which holds bait, food, or an attractant and has a raised lip to slot into the loading frame 102.

Figure 23:
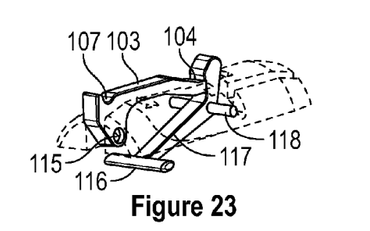
FIG. 23: illustrates a still further component of the pest extermination device of FIG. 20, particularly a dual axis leveraged firing mechanism.

With reference now to FIG. 23 of the DRAWINGS, there is shown a dual axis leveraged firing mechanism, generally shown in highlight, including the firing arm 103, which includes a lip 107 for the holding the stretchable ring 122, and a hole 115 therein for a shaft 119 (as shown and described in connection with FIG. 24) to allow the firing arm 103 to pivot. Also shown, unhighlighted, are a release arm generally designated by the reference numeral 117 that includes a terminus 116 thereof, which contacts the aforementioned pest entering the device 100, a sear 104, which holds the firing arm 103 in a locked and armed position, and a shaft generally designated by the reference numeral 118, which allows the release arm 117 to pivot.

With reference now to FIG. 24 of the Drawings, there is shown a firing mechanism assembly, including a platform generally designated by the reference numeral 120, upon which the aforedescribed firing arm 103 sits in the locked and armed position. Also shown is a shaft generally designated by the reference numeral 119 (shown as bisected) for the firing arm 103, which allows the firing arm 103 to pivot. FIG. 24 also shows an inset generally designated by the reference numeral 121 for the aforementioned shaft 118 for the release arm 117 (see also FIG. 26), which allows the release arm 117 to pivot, as is understood to those of skill in the art.

Turning now to FIGS. 25 and 26 of the DRAWINGS, there is illustrated therein the aforedescribed firing mechanism in cross-section, including the firing arm 103, which includes the aforedescribed lip 107 for holding the aforementioned stretchable ring 122 (see also FIG. 28) and the aforesaid hole 115 for the shaft 119 for the firing arm 103. Also shown are the release arm 117 that includes the terminus 116, which contacts the pest, a shaft 118, which allows the release arm 117 to pivot, and a sear 104, which holds the firing arm 103 in a locked and armed position.

With reference now to FIG. 27 of the DRAWINGS, there is shown the aforementioned stretchable ring 122 (shown unexpanded and not tightened), while FIG. 28 shows an armed loading frame 102, including an expanded stretchable ring 122 loaded onto the lip 107 of the firing arm 103 and at a mouth 24 of the loading frame 102, which connects with the aforementioned channel 113 or the pest passage.

Also shown in FIG. 28 are the release arm 117 with the terminus 116, which contacts the pest passing through the aforesaid mouth 124, and the sear 104, which holds the firing arm 103 in a locked and armed position. FIG. 28 also shows a cut-out 125 of the loading frame 102, which slots into the raised lip of the aforementioned bait vestibule 111, as shown in FIG. 22, leaving the vestibule accessible to the pest from the inside of the docked loading frame 102. Further shown are a platform 120 on which the firing arm 103 sits and a recess 123, which fits the terminus 116 of the release arm 117.

The safety tunnel 101, shown in more detail in FIGS. 20 and 22, will now be described further. As shown, the safety tunnel 101 includes the opening 114 to the outside world at one end thereof, and is substantially tubular, particularly inside, with an internal channel 113. Accordingly, the safety tunnel 101 may be circular or substantially circular in cross-section, as shown in the DRAWINGS, or may have another suitable cross-section, as is understood in the art, such as an oval or square. It should be understood that in certain embodiments, the bottom of the opening 114 or channel 113, or other parts of the tunnel, may be flattened instead of rounded, thereby providing a surface for the pest to traverse more easily. It should further be understood that the diameter of the channel 113 is preferably chosen to suit the target pest, as described in more detail with illustrative examples hereinbelow, and the channel 113 has the entrance or opening 114 at a first end where the pest enters.

The overall size and dimensions of the opening 114 and channel 113 of the safety tunnel 101 may be larger or smaller, as needed to suit the size of the pest, as is generally understood in the art. For example, for small pests, such as mice, rats and stoats, the diameters of the opening 114 and/or channel 113 are preferably in the range of about 20 mm to about 40 mm, or, for example, about 15 mm, about 20 mm, about 25 mm, about 30 mm, about 35 mm, about 40 mm, or about 45 mm, and may also be about 30 mm to about 100 mm, or, for example, about 50 mm, about 60 mm, about 70 mm, about 80 mm, about 90 mm, about 100 mm, or about 110 mm.

For larger pests, such as polecats, possums and cats, the diameters are preferably in the range of about 40 mm to about 120 mm, or, for example, about 35 mm, about 40 mm, about 50 mm, about 60 mm, about 70 mm, about 80 mm, about 90 mm, about 100 mm, about 110 mm, or about 120 mm. The larger pest diameters may also range from about 100 mm to about 250 mm, or, for example, about 90 mm, about 100 mm, about 110 mm, about 120 mm, about 130 mm, about 140 mm, about 150 mm, about 160 mm, about 170 mm, about 180 mm, about 190 mm, about 200 mm, about 225 mm, about 250 mm, or about 270 mm. It should further be understood that the diameters of the opening 114 and the channel 113 may be identical or differ, e.g., to better accommodate the behaviour of the intended pest in enticing it to enter, such as by the space narrowing or expanding as the pest traverses.

The loading frame 102 is shown in more detail in FIGS. 21 and 28, respectively. To arm the device, the stretchable ring 122 is loaded onto the loading frame 102, for example, by introducing the ring onto the non-return knob 108 at the narrow end of the loading frame 102, and rolling the ring 122 over the non-return ridges 110 until reaching the lip 107 of the firing arm 103, thereby arming the loading frame 102. It should also be understood that other devices, such as the tapering device of FIG. 19, may be employed to expand the ring 122 more easily and safely, thereby arming the device 100. The armed loading frame 102, so loaded, is then docked at the safety tunnel 101. When docked, the mouth 124 of the loading frame 102 preferably faces the aforementioned opening 114 and channel 113 of the safety tunnel 101, as illustrated, forming a pest passage. The cut-out 125 of the loading frame 102 is preferably docked over the aforementioned bait vestibule 111 of the safety tunnel 101, creating a covered region to hold the bait, food, or attractant, as illustrated.

As indicated hereinabove, it should be understood that the loading frame 102 may be circular in cross-section, as shown in the DRAWINGS, or may have other suitable cross-sections. For example, in certain embodiments, the bottom of the loading frame 102 or other parts of the frame may be flattened. As discussed, the diameter of the loading frame 102 is preferably chosen to suit the target pest and the mouth 124 is situated at a first end where the pest begins to enter the aforementioned pest passage to the bait. The diameter of the mouth 124 is preferably smaller than the diameter of the opening 114 or the channel 113 of the safety tunnel 101, as described above, for most intended pests. While the opening 114 and the channel 113 of the safety tunnel 101 are preferably sized to the body of the pest, allowing the pest to enter and walk through, the mouth 124 of the loading frame 102 is preferably sized to the head of the pest, allowing the pest to poke its head into the bait chamber 111. It should of course be understood that more of the pest may enter the mouth 124 than just the head.

Once armed, the loading frame 102 may be docked at the safety tunnel 101 to engage the device 100. The loading frame 102 may be secured by one or more sets of the aforementioned security lugs 106 on the safety tunnel 101 and security slats 109 on the loading frame 102, which is shown in detail in FIGS. 20 to 22.

The loading frame 102 may be further secured by one or more of the aforementioned and described security clips 112 (as shown in FIG. 22) on the safety tunnel 101, which fit into recesses on the frame. In addition, the loading frame 102 may be secured by slotting the cut-out 125 into the lip of the aforesaid bait vestibule 111.

In accordance with the various embodiments of the present invention, the loading frame 102 is preferably docked by sliding the bottom of the frame forward along the bottom of the channel 113 of the safety tunnel 101, until the frame slots into place. It should, of course, be understood that other means of docking may be suitable, as is understood by those of skill in the art. For example, the loading frame 102 could be docked at the safety tunnel 101 using clips, Velcro, or other attachment or adhesive means.

When the device 100 is armed and docked, the firing mechanism of the loading frame 102 is ready to release or shoot the aforementioned expanded ring 122 onto any pest that enters the device. The dual axis leveraged firing mechanism is shown in more detail in FIGS. 23 and 28, respectively. As shown, the pest enters through the opening 114 of the safety tunnel 101 and through the channel 113, which leads to the docked and armed loading frame 102, as also illustrated in FIGS. 20 and 22. Being docked, the armed loading frame 102 is positioned over the bait vestibule 111 of the safety tunnel 101, which contains the requisite bait, food, or attractant to lure the pest. The pest, desirous of the bait or careless, triggers the dual axis, leveraged firing mechanism when the pest's head or head portion comes into contact with the terminus 116 of the release arm 117 positioned above the bait vestibule 111. By pushing the terminus 116 upwards to obtain the bait, the pest disengages the sear 104, and releases the firing arm 103, allowing the arm to pivot towards the pest. The stretchable ring 122 then springs free of the lip 107 of the firing arm 103 and contracts around the pest, for example, around the neck of the pest. It should be understood, however, that the ring 122 may contract and constrict around any body part as a result of the triggering due to the position and movement of the pest.

Thus, when armed, the stretchable ring 122 is mounted relative to the mouth 124 of the loading frame 102 in a release position, just adjacent to the open mouth 124. After the stretchable ring 122 is released from the open mouth 124, the ring contracts around whatever is within the open mouth 124 of the loading frame 102. Any pest that pushes up the terminus 116 of the release arm 117, therefore, has immediately put around its neck or upper body the aforementioned collapsing, expanded stretchable ring 122, which upon constriction will cut off the blood and air supply to the animal, thereby killing it humanely. The terminus 116, which triggers the device to fire, may be presented in any form, for example, a bar, a paddle, a pillow, or a pad. Other trigger mechanisms may also be suitable for this purpose, as are understood to those of skill in the art.

The stretchable ring 122 is preferably dimensioned and the material used for the ring 122 is chosen to create a sufficient inwards force to achieve a purpose of the invention: to exterminate pests through constriction. For use with the device 100, the stretchable ring 122 has a normal diameter that is preferably significantly less than the diameter of the loading frame 102 at the release position so that, on release from the mouth 124 of the loading frame 102, the ring 122 contracts to its normal size, which is preferably less than the size of the neck of the target pest, e.g., a mouse. A suitable ring 122 for the extermination of mice, rats, stoats and squirrels may have an outside diameter of about 14 mm and an inside diameter of about 5 mm. Rings used in New Zealand for docking sheep's tails have been found suitable, as well as rings used for sheep and cattle castration, e.g., elastrator rings. Rings of different sizes are, of course, suitable for pests of different sizes, and are within the ambit of the instant invention, as claimed.

The stretchable ring 122 may be formed of natural or synthetic rubber or a composite material. Natural latex rubber rings are particularly suitable. It could also be formed from metal in the form of a spring, or at least partly of rigid material with a biasing means tending to force sides of the ring together. While the stretchable ring 122 is preferably circular in shape, it could, for example, be formed from a rectangle (or octagonal, etc.) of stretchable material with a hole cut through it. Other configurations may also be suitable. It will be understood that the stretchable ring 122 must have sufficient elasticity to expand over the mouth 124 of the loading frame 102, but sufficient strength to contract over the neck of the pest and cause asphyxiation. Thus, larger rings can be designed based on sheep docking rings (e.g., elastrator rings), to encompass rings with a larger diameter, but with comparable elasticity and strength as docking rings.

Notably, the dual axis leveraged firing mechanism of the instant invention uses the inertia produced by the expansion of the stretchable ring 122 over the loading frame 102 in the armed position to propel the said ring onto the targeted pest. Thus, through its own inertia the stretchable ring is fired onto the neck/chest area of the pest, which causes the pest to spring backwards free of the extermination device, and die quickly and humanely next to the device or in the immediate vicinity of the device 100. After the ring 122 is fired, the pest and the stretchable ring 122 can thus be expelled free of the device, and are not entangled therewith. Thus, since the body of the pest is not attached to the device 100, this allows a person to reset the device 100 with a new ring 122 without touching the dead pest's body. Also, the device 100 is not affected by the decaying remains of the pest.

With reference now to FIG. 20 of the DRAWINGS, there is shown a further feature of the safety tunnel 101, which is provided and designed to protect against accidental tripping of the terminus 116. The safety tunnel 101 is covered but includes the opening 114 and the channel 113 to allow a pest to access the mouth 124 of the loading frame 102, as described, through a so-called pest passage. The safety tunnel 101 is thereby in line with the loading frame 102 and is positioned so that the pest can still reach the bait vestibule 111 and actuate the trigger mechanism by pushing on the terminus 116 in the loading frame 102. It should be understood, however, that in alternate embodiments of the present invention, the loading frame 102 may be used without the safety tunnel 101. For example, the loading frame 102 may have a flattened bottom and/or its own bait vestibule 111. Alternatively, the loading frame 102 may be docked onto a simple base structure which lacks a tunnel feature.

It should be understood that the armed device 100 may be placed in any position that a pest can access. Thus, the device 100 may be placed on the floor or ground, in a tree or attached to a board or post, as examples. The safety tunnel 101 may be modified to allow attachment, for example, by adhesive, nails, screws, tacks, etc. The bottom of the safety tunnel 101 may be flat or may be have a shape or texture to provide grip and/or stability. The safety tunnel 101 may slot or fit into a frame which is attached, permanently or semi-permanently, to a surface.

The various parts of extermination device 100, for example, the safety tunnel 101 and loading frame 102, may be formed out of any natural or synthetic materials or combinations thereof. Exemplary materials include plastics, composites, and the like, for example, polymer compositions such as polyethylenes (e.g., high density polyethylenes and polyethylene terephthalate), polypropylenes, polystyrenes, and polyvinyls (e.g., polyvinyl chloride). The safety tunnel 101 may be formed from an opaque material to encourage pests to enter. The shell of the loading frame 102 may be formed from a translucent or clear material, to allow the user to see the firing mechanism. The various parts may be produced by any moulding, casting, and extrusion processes as are well known in the art.

While the present invention has been illustrated by the description of the embodiments thereof, and while the embodiments have been described in detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the breadth or scope of the applicant's concept.

We claim:

1. A vermin exterminating device comprising:
   a loading frame, said loading frame having a closed passage therein with an open end;
   a safety tunnel device, said safety tunnel device engageably connected to said loading frame, said safety tunnel device having a tunnel therethrough,
   wherein a diameter of said tunnel is greater than a diameter of said open end, whereby said tunnel, upon engageable connection of said safety tunnel device and said loading frame, aligns with said open end;
   a firing arm, said firing arm attached to said loading frame by a first pivot;
   a release arm, said release arm connected to a second pivot of the loading frame by a shaft, said release arm being pivotably attached to said loading frame by said second pivot and shaft, said release arm, when said device is armed, extending into said closed passage, said release arm comprises a sear, said sear holding an end of said firing arm in a locked and armed position; and at least one resilient ring disposed on a lip of said firing arm adjacent said open end;

wherein upon movement of said release arm by said vermin, said release arm pivots about said shaft and disengages said firing arm from said sear, said at least one resilient ring, expanded onto said lip, is released from said firing arm onto said vermin, said at least one resilient ring, upon release by said firing arm onto said vermin, detaches from said vermin extermination device so as to be free therefrom and contracts onto said vermin, whereby said vermin is killed by contraction of said at least one resilient ring thereon.

2. The extermination device according to claim 1, wherein said safety tunnel comprises a bait vestibule.

3. The extermination device according to claim 2, wherein said loading frame comprises a cut-out portion, said cut-out portion, upon loading said loading frame onto said safety tunnel device, substantially aligns with said bait vestibule.

4. The vermin extermination device according to claim 1, wherein said tunnel has an internal configuration selected from the group consisting of: circular, oval and rectangular.

5. The vermin extermination device according to claim 1, wherein said tunnel has a flattened portion therein.

6. The extermination device according to claim 1, further comprising:
a security lug for interconnecting said loading frame and said safety tunnel device.

7. The extermination device according to claim 1, wherein said release arm is substantially disposed above a bait vestibule.

8. The extermination device according to claim 1, wherein said loading frame has a slot therethrough, said firing arm being positioned within said slot.

9. The extermination device according to claim 1, wherein the loading frame is configured to hold a plurality of resilient rings and to hold a first one of the resilient rings at a release position.

10. The extermination device according to claim 1, configured to release the at least one expanded resilient ring, such that it contracts around a neck of the vermin.

11. The vermin extermination device according to claim 1, wherein said loading frame is tapered from said open end to a closed end thereof,
wherein a surface of said loading frame between said open and closed ends includes at least one non-return ridge,
whereby in arming said at least one resilient ring onto said lip, said at least one resilient ring which is unexpanded is loaded onto said loading frame at said closed end and rolled toward said open end, said at least one non-return ridge preventing the at least one resilient ring which is expanded from moving toward said closed end.

12. The vermin extermination device according to claim 1, wherein said loading frame is tapered from said open end to a closed end thereof, further comprising:
a non-return knob at said closed end,
whereby in arming said at least one resilient ring onto said lip, said at least one resilient ring which is unexpanded is loaded onto said loading frame at said closed end and rolled around said non-return knob toward said open end, said non-return knob preventing the at least one resilient ring from moving toward said closed end.

13. The vermin extermination device according to claim 1, further comprising:

a loading device having a tapering body adapted to allow a resilient ring to be expanded from a narrow end to a wide end of the tapering body,
wherein the wide end includes a formation adapted to engage with said lip of said firing arm.

14. The vermin extermination device according to claim 1, wherein the vermin are selected from the group consisting of mice, rats, stoats, polecats, possums and other animals considered vermin.

15. The vermin extermination device according to claim 1, wherein the diameter of said open end is a range selected from the group consisting of about 20-40 mm, about 30-100 mm, and diameters consistent with said vermin.

16. The vermin extermination device according to claim 1, wherein the diameter of said open end is selected from the group consisting of about 15, 20, 25, 30, 35, 40, 45, 50, 60, 70, 80, 90, 100 and 110 mm.

17. The vermin extermination device according to claim 1, wherein the diameter of said open end is a range selected from the group consisting of about 40-120 mm, about 100-250 mm, and diameters consistent with said vermin.

18. The vermin extermination device according to claim 1, wherein the diameter of said open end is selected from the group consisting of about 35, 40, 50, 60, 70, 80, 90, 100, 110, 120, 130, 140, 150, 160, 170, 180, 190, 200, 225 and 250 mm.

19. The vermin extermination device according to claim 1, wherein said extermination device is affixable to an object or surface selected from the group consisting of the ground, a tree, a pole, a post, a board, a horizontal surface and a vertical surface.

20. The vermin extermination device according to claim 1, wherein a bait or attractant is placed adjacent said release arm prior to configuring said vermin extermination device to kill said vermin.

21. The vermin extermination device according to claim 1, wherein said extermination device is armed by a user locking said firing arm into said first pivot, and placing said at least one resilient ring onto said lip of said firing arm.

22. The vermin extermination device according to claim 1, wherein said at least one resilient ring is made of a material selected from the group consisting of: natural rubber, synthetic rubber, a composite material and a metal.

23. The vermin extermination device according to claim 1, wherein said at least one expanded resilient ring has a configuration selected from the group consisting of: circular, oval and rectangular.

24. The vermin extermination device according to claim 1, wherein said at least one resilient ring which is expanded, upon release, contracts to a normal size, the at least one resilient ring which is contracted at said normal size having an inner diameter less than a neck size of the vermin.

25. A kit for a vermin extermination device comprising:
a loading frame, said loading frame having a closed passage therein with an open end;
a safety tunnel device, said safety tunnel device engageably connected to said loading frame, said safety tunnel device having a tunnel therethrough,
wherein a diameter of said tunnel is greater than a diameter of said open end, whereby said tunnel, upon engageable connection of said safety tunnel device and said loading frame, aligns with said open end;
a firing arm and a release arm, said release arm when configured placed along said open end of said closed passage;
said firing arm attached to said loading frame by a first pivot;

said release arm connected to a second pivot of the loading frame by a shaft, said release arm being pivotably attached to said loading frame by said second pivot and shaft, said release arm comprising a sear, and said release arm, when said device is armed, extending into said closed passage;

said firing arm when configured connected to said release arm, said firing arm held at one end thereof by said sear of said release arm in a locked and armed position; and at least one resilient ring disposed on a lip of said firing arm adjacent said open end, wherein upon movement of said release arm by said vermin, said release arm pivots about said shaft and disengages said firing arm from said sear, releasing said at least one resilient ring placed thereon onto said vermin;

said at least one resilient ring, when configured and upon release by said release arm onto said vermin, detaches from said vermin extermination device and contracts onto said vermin, whereby said vermin is killed by contraction of said at least one resilient ring thereon.

26. A method of exterminating vermin, the method comprising employing the vermin extermination device of claim 1.

27. A method of exterminating a pest, comprising:

providing the vermin extermination device according to claim 1;

holding said at least one resilient ring on said firing arm of said loading frame such that it is expanded, said at least one resilient ring which is expanded posed along said open end of said closed passage of said loading frame, a bait or attractant being placed within said closed passage; and releasing the at least one resilient ring which is expanded to be free of the loading frame such that it contracts around a pest free from said loading frame when said pest actuates said release arm, thereby exterminating the pest.

28. A method of exterminating vermin comprising:

providing the vermin extermination device according to claim 1;

arming said firing arm into the first pivot;

loading said at least one resilient ring onto said firing arm, said at least one resilient ring loaded being expanded thereby;

setting said release arm into said second pivot;

positioning said release arm along said open end of said loading frame; and placing a bait or attractant within said closed passage, wherein upon actuation of said release arm by the vermin, said firing arm disengages from said sear and said at least one resilient ring which is expanded is released from said extermination device onto said vermin, such that said at least one ring is free from said extermination device, whereby said at least one resilient ring which is released contracts upon and kills said vermin.

* * * * *